Dec. 11, 1962 C. J. WERNER 3,067,840
AUTOMATIC BRAKE ADJUSTOR FOR VEHICLE DRUM BRAKE
Original Filed Nov. 10, 1958 4 Sheets-Sheet 1

INVENTOR.
Calvin J. Werner
BY D. C. Staley
HIS ATTORNEY

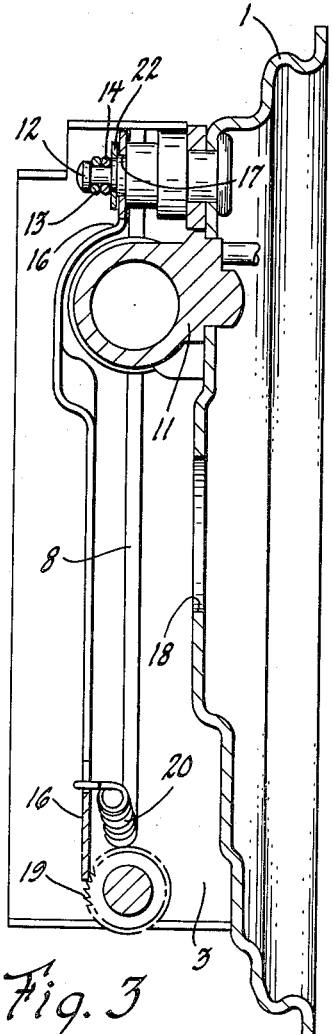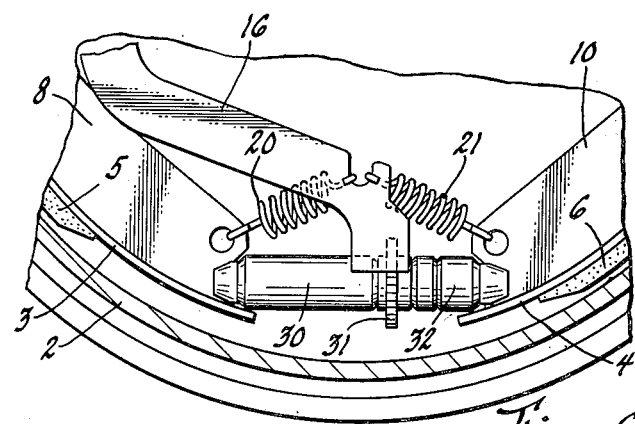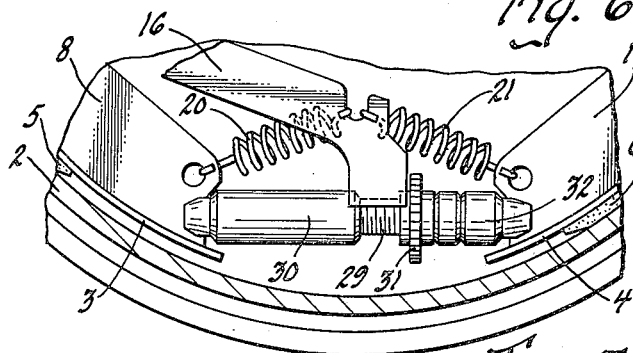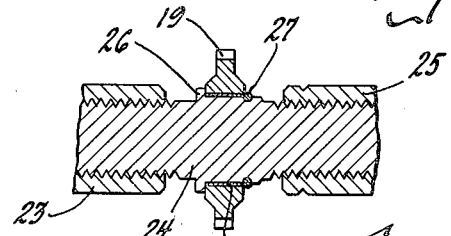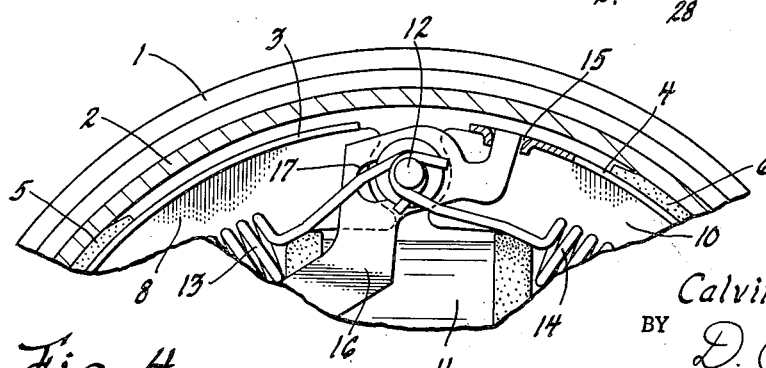

Dec. 11, 1962 C. J. WERNER 3,067,840
AUTOMATIC BRAKE ADJUSTOR FOR VEHICLE DRUM BRAKE
Original Filed Nov. 10, 1958 4 Sheets-Sheet 3
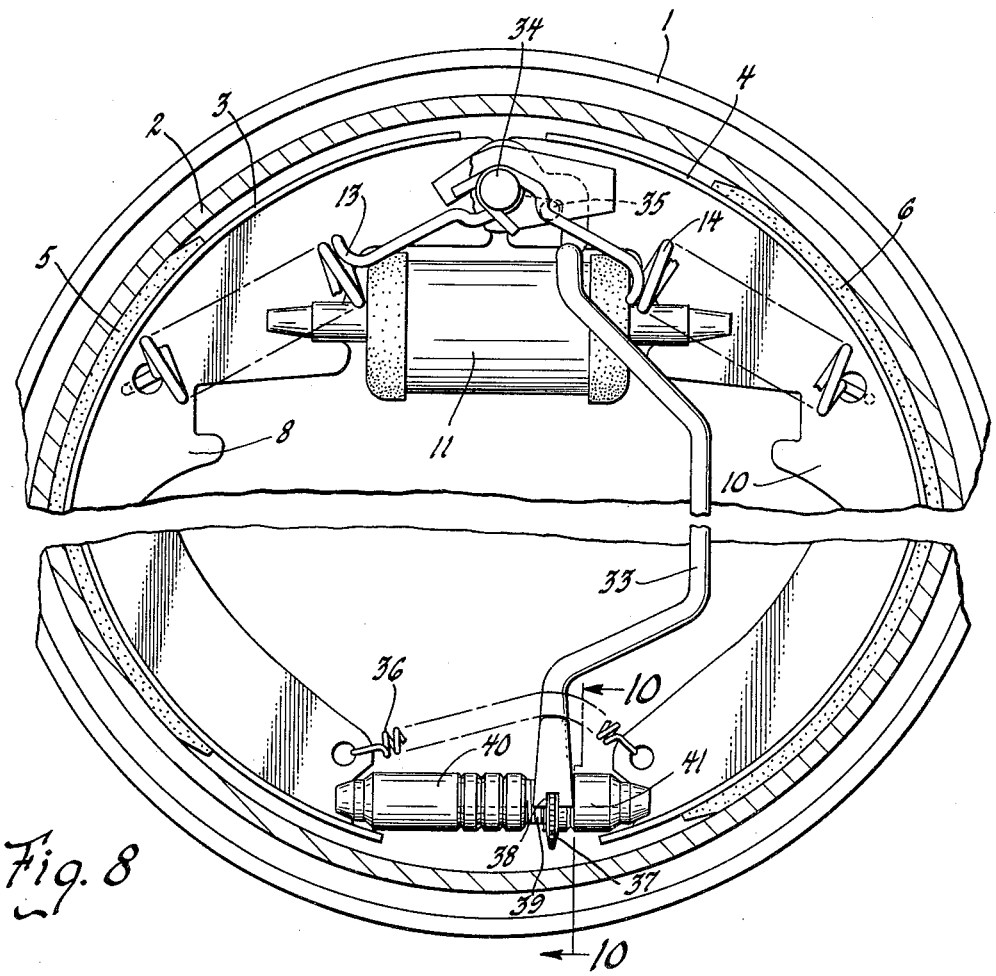
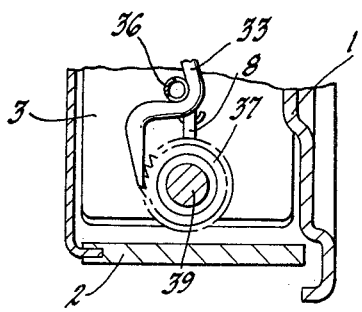
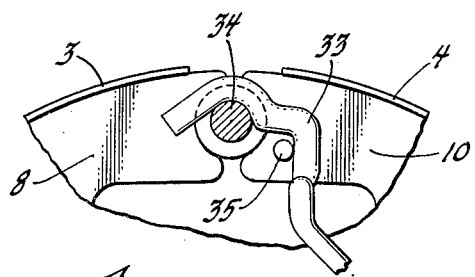
INVENTOR.
Calvin J. Werner
BY
D. C. Staley
HIS ATTORNEY

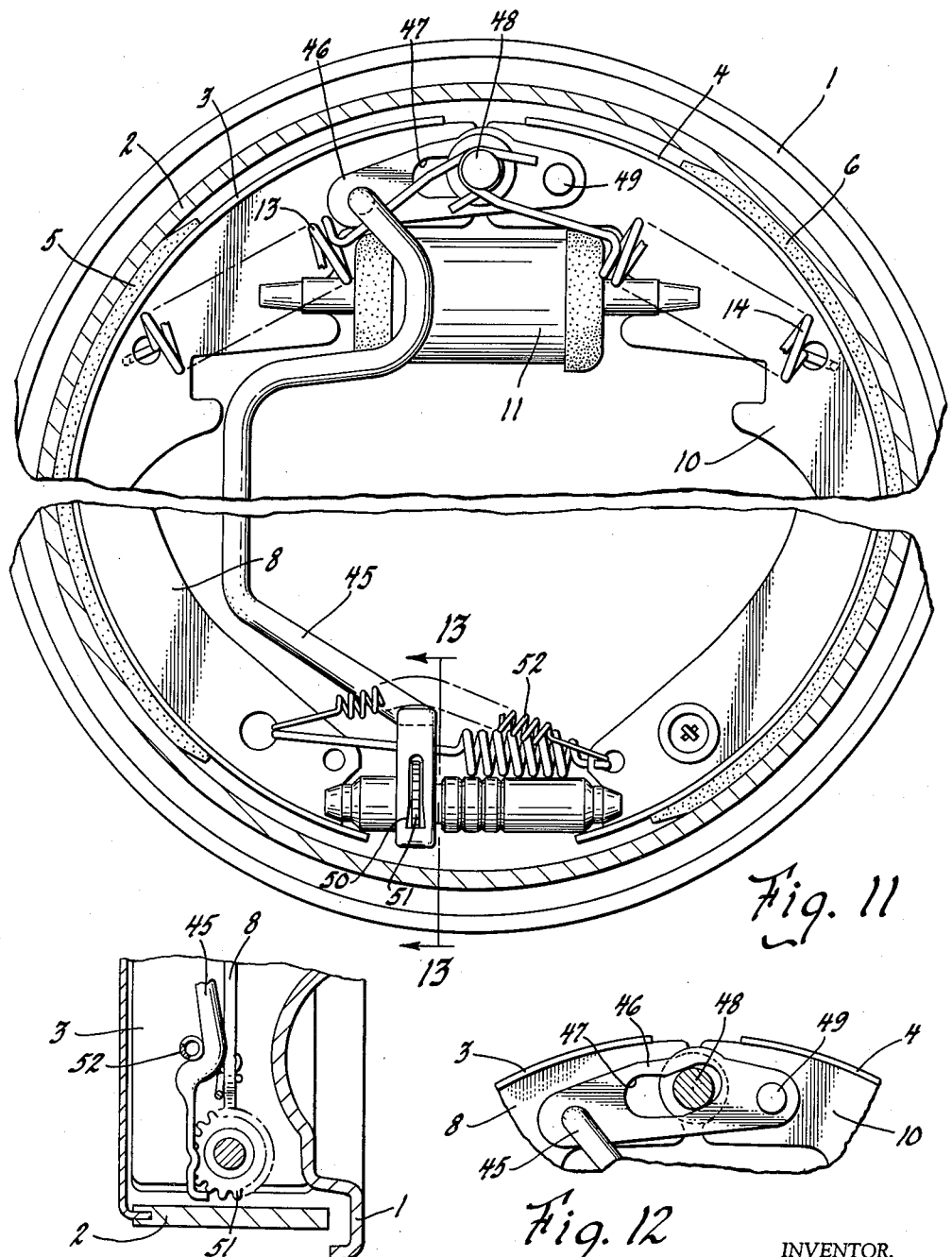

United States Patent Office 3,067,840
Patented Dec. 11, 1962

3,067,840
AUTOMATIC BRAKE ADJUSTOR FOR VEHICLE DRUM BRAKE
Calvin J. Werner, Dayton, Ohio, assignor to General Motors Corporation, Detroit, Mich., a corporation of Delaware
Original application Nov. 10, 1958, Ser. No. 772,815. Divided and this application July 8, 1960, Ser. No. 41,543
5 Claims. (Cl. 188—79.5)

This invention relates to a vehicle drum brake and more particularly to an automatic adjustor for a vehicle drum brake.

This patent application is a divisional application of the patent application Ser. No. 772,815, filed November 10, 1958, now abandoned.

The operation of vehicle brakes necessitates adjustments to provide the proper clearance between the brake shoes and the brake drum. This is usually accomplished by means of a manually adjustable strut provided in the brake structure which requires attention from the operator of the vehicle from time to time in providing these brake adjustments. It would be advantageous if an automatic adjustor were provided within the brake structure, and thereby eliminate the need for any manual adjustment.

It is an object of this invention to provide an automatic vehicle drum brake adjustor which operates during the braking cycle of the vehicle brakes.

It is another object of this invention to provide an arm within the braking structure which is located near the anchor pin and moved relative to the anchor pin. This arm is held in position on its lower end which is adjacent the ratchet wheel of an adjustable strut by means of two springs. These springs perform the function of centering the ratchet arm, maintaining constant contact of the brake shoes against the adjustable strut, and maintaining constant contact between the ratchet arm and the ratchet wheel.

It is a further object of this invention to provide a self-disengaging ratchet arm from the ratchet wheel on the adjustable strut member between two cooperative adjacent ends of the brake shoes.

It is a further object as a modification of this invention to provide a self-aligning slot on the ratchet arm for receiving the ratchet wheel of the adjustable strut member. A single spring replaces the two springs of the original version.

It is a further object of this invention to provide a thermo release of the ratchet wheel from the adjusting screw.

These objects are accomplished by means of an arm which is actuated by the braking structure during the braking cycle. The lower end of this arm is provided with a ratchet means for engaging the ratchet wheel, or star wheel, of an adjustable strut between cooperative adjacent ends of the brake shoes. Two springs are connected to this ratchet portion of the arm. These springs provide the function of maintaining the constant contact between the adjacent cooperative ends of the brake shoes and the adjusting strut. They also maintain the ratchet arm in constant contact with the ratchet wheel and aid in rotating the ratchet wheel. The springs function as a centering means for the ratchet arm. The invention also incorporates a ratchet wheel which is connected to the screw member in the adjustable strut by means of a metal of low melting point. This is a safety feature to guard against over-adjustment when brakes are overheated.

A modified version of a safety feature which is incorporated in this invention is a screw member which moves the ratchet wheel out of engagement with the ratchet when the lining has worn thin and the shoes are in need of relining. This device also uses the two springs performing the same function as that in this invention described in the preceding paragraph.

During actuation of the brakes, the adjuster operates by means of a camming portion of the ratchet arm on the anchor pin. The arm extending from the anchor pin has a ratchet portion which engages the ratchet wheel. In another modified version of this invention, this ratchet portion is provided with an alignment slot for selfcentering of the ratchet arm on the ratchet wheel. This version employs a single spring for maintaining constant contact between the ratchet arm and the ratchet wheel.

Further objects and advantages of the present invention will be apparent from the following description, reference being had to the accompanying drawings wherein a preferred embodiment of the present invention is clearly shown.

In the drawings:

FIG. 1 is a side elevation view of a vehicle drum brake structure. The drum is the only portion shown in cross section. This version shows two springs maintaining the ratchet arm in position and a double screw having a right hand and a left hand thread connected to the ratchet wheel of the adjustable strut.

FIG. 3 is a cross section view of a vehicle drum brake showing the adjusting device and taken on line 3—3 of FIG. 1.

FIG. 4 is a fragmentary view showing the adjusting device as the brakes are in operation. This view is similar to that shown in FIG. 1, except

FIG. 5 is a cross section view of the adjustable strut showing the metal for connecting the ratchet wheel to the screw member of the adjustable strut. This view is taken on line 5—5 of FIG. 1.

FIG. 6 is a view of a modified version of this invention. It shows the ratchet arm being held in position by means of two springs with the ratchet arm engaging the ratchet wheel.

FIG. 7 is a similar view to that of FIG. 6, except the ratchet wheel has rotated out of engagement with the ratchet arm. This position indicates the brakes are adjusted to the point where new linings are required.

FIG. 8 is a view of a modified version of this invention. The ratchet arm is actuated by a pin in the brake shoe webbing, and also a camming surface on the upper portion of the arm adjacent the anchor pin. This modification also shows an aligning slot on a ratchet arm adjacent the ratchet wheel.

FIG. 9 is a fragmentary view taken from FIG. 8 showing the location of the actuating pin in the brake webbing and the camming portion on the arm.

FIG. 10 is a cross section view taken on line 10—10 of FIG. 8 and shows the ratchet arm engaging the ratchet wheel of the adjustable strut.

FIG. 11 is a view of another modified version of this invention which shows a link member connected to the ratchet arm and the brake shoe webbing. This link is cammed on the anchor pin of the braking structure. An alignment slot is also shown on the ratchet portion of this arm for aligning the ratchet arm with the ratchet wheel.

FIG. 12 is a fragmentary view which shows the ratchet arm, the connecting link cammed on the anchor pin, and the brake shoe webbing in an operative position.

FIG. 13 is a cross section view taken on line 13—13 of FIG. 11 and shows the ratchet arm in contact with the ratchet wheel.

Figure 1:
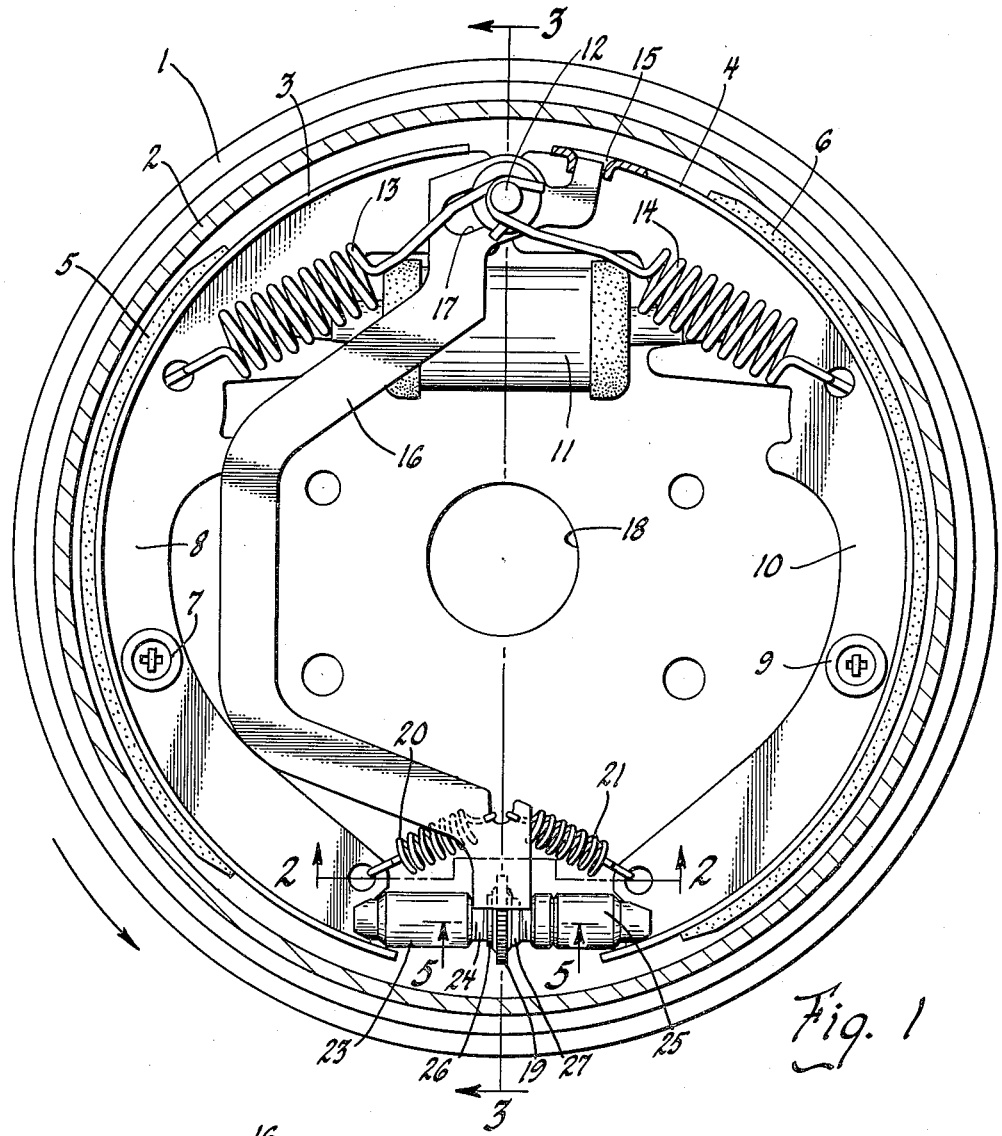
FIG. 1 shows the brake in an inoperative position.

FIG. 1 is a view of the brake structure with the automatic adjustor located therein. The braking structure includes a backing plate 1 mounted adjacent a rotating drum 2. A primary shoe 3 and secondary shoe 4 are located for frictionally engaging the drum 2. A friction material 5 is disposed on the primary shoe 3 and a friction material 6 is also disposed on the secondary shoe 4. The primary shoe 3 is held in position by means of a pin assembly 7 which supports the primary brake shoe webbing 8. A similar pin assembly 9 is provided for supporting the secondary shoe 4 by means of the secondary shoe webbing 10. A wheel cylinder 11 is operatively positioned between two of the cooperative adjacent ends of the brake shoe webbings 8 and 10. The anchor pin 12 is positioned between a portion of these two cooperative adjacent ends of the primary brake shoe webbing 8 and secondary brake shoe webbing 10. A spring 13 connected to the primary brake shoe webbing 8 and the anchor pin 12 maintaining the primary brake shoe in contact with anchor pin 12 when in the retracted position. A spring 14 is positioned between the anchor pin 12 and the secondary brake shoe webbing 10 for maintaining the secondary brake shoe abutting the anchor pin 12 when in the retracting position.

A portion of the brake shoe 4 is slotted at 15 for receiving the upper end of the actuating or ratchet arm 16. This arm 16 engages the end portion of slot 15 and is guided in its movement by a cam slot 17 which receives anchor pin 12. The actuating arm or ratchet arm extends downward around the wheel shaft hole indicated at 18 to a point adjacent the ratchet wheel 19 of the adjustable strut. The lower portion of the ratchet arm is connected to the lower cooperatively adjacent portion of the primary and secondary brake shoe webbings 8 and 10 by means of springs 20 and 21.

Figure 2:
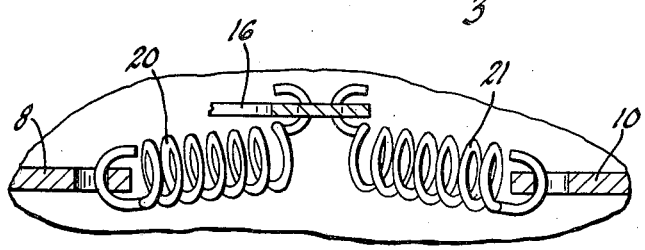
FIG. 2 is a cross section view of the two springs connected to the ratchet arm and the cooperative adjacent ends of the brake shoes near the adjustable strut. This view is taken on line 2—2 of FIG. 1.

FIG. 2 is an enlarged view of these two springs. The springs extend diagonally from the ratchet arm 16 to the brake shoe webbings 8 and 10. This angular position of springs 20 and 21 provides an axial component parallel with the wheel shaft for maintaining contact between the ratchet arm 16 and ratchet wheel 19, a tangential component for maintaining contact between the brake shoe webbing 8 and 10 and the adjustable strut and centering of the ratchet arm, and a component for maintaining the ratchet arm firmly against the cam portion 17 on the upper end of the ratchet arm and rotating the ratchet wheel 19. The various components of force produced by the springs 20 and 21 are shown in FIGS. 1, 2, and 3.

FIG. 3 shows the anchor pin 12 directly connected to the backing plate 1. The two return springs 13 and 14 are shown in cross section directly connected to the anchor pin 12. A spacer 22 is disposed between these return springs and the camming portion of the ratchet arm 16. The primary brake shoe webbing 8 is shown adjacent to camming portion 17 of the ratchet arm 16. The wheel cylinder 11 which is operatively positioned between the brake shoes is shown mounted on the backing plate 1. The lower portion of the ratchet arm 16 is held in constant contact with the ratchet wheel 19 by the springs 20 and 21.

FIG. 4 shows a fragmentary view of FIG. 1 with the ratchet arm in operative position as the brakes are actuated. The camming slot 17 indicates that the upper portion of the ratchet arm 16 is rotated slightly circumferentially within the brake drum as the camming surface 17 lifts the ratchet member slightly as it engages the anchor pin 12. The full length of slot 17 is not used. This eliminates any possibility of a short slot preventing brake operation when the brakes are excessively worn.

FIG. 5 shows the cross section view of the adjustable strut. The adjustable strut comprises a sleeve member 23 which has a slot on its outer end for receiving the primary brake shoe webbing 8. The internal portion of this sleeve 23 is threaded and receives the screw member 24. The screw member 24 is also threaded on its opposite end. Sleeve 25 is slotted on its outer end for receiving the secondary brake shoe webbing 10. The inner portion of 25 threadedly engages the screw member 24. The threaded portions on screw member 24 are constructed with a right hand thread on one end and a left hand thread on the other end to provide for an expansion in both directions of the adjustable strut as a ratchet wheel 19 is rotated. The ratchet wheel 19 abuts a flange 26 on the screw member and is held in position on its opposite side by means of a snap ring 27. The ratchet wheel 19 and screw member 24 rotate as a unit at low temperatures as they are connected by a metal at 28. The metal which is placed between the ratchet wheel 19 and screw member 24 is of a low melting point such that when the brakes are at a high temperature, the metal is in a fluid state. In event of any rotation of the ratchet wheel 19 by the ratchet arm 16 when the brakes are at a high temperature, this rotation is not effective in rotating the screw member 24 because there is a fluid metal connection between these two elements.

FIGS. 6 and 7 illustrate a modified version of the automatic adjustor of a braking means. The adjusting screw member 29 is threaded on one end only. This screw member 29 threadedly engages the inner portion of sleeve 30 which receives the primary brake shoe webbing 8 within a slot on its outer end. The ratchet wheel 31 is directly connected to the screw member 29. The opposite end of the screw member 29 has a smooth cylindrical portion which extends into a sleeve portion of member 32. Member 32 is provided with a slot on its outer end for receiving the secondary brake shoe webbing 10.

The springs 20, 21 perform the same function on this modification as in the original version of this invention. FIG. 6 shows the ratchet arm 16 engaging the ratchet wheel 31 for rotation in adjusting the brakes. Due to the fact that a screw is provided only on one side of the star or ratchet wheel 31, as the star wheel is rotated, the star wheel moves away from its central position on the adjustable strut. FIG. 7 shows the position as the star wheel has rotated the screw member 29 sufficiently so that it no longer engages the ratchet arm 16.

FIGS. 8, 9 and 10 show another modified version of the automatic brake adjustor. The ratchet arm 33 is mounted within the braking structure and extends around the upper portion of anchor pin 34. The upper portion of the ratchet arm 33 also engages a pin 35 which is positioned on the secondary brake shoe webbing 10. Return springs 13 on the primary shoe and 14 on the secondary shoe retract the brake shoes in a rest position against the anchor pin 34. The wheel cylinder 11 is also operatively positioned between the cooperatively adjacent ends of the primary brake shoe webbing 8 and the secondary brake shoe webbing 10.

The opposite adjacent ends of the primary brake shoe webbing 8 and secondary brake shoe webbing 10 are held in constant contact with the ends of the adjustable strut by means of a spring 36. This spring holds the ratchet arm in contact with the anchor pin 34 at all times. By means of a camming surface on the upper end of the ratchet arm in contact with the anchor pin 34, the spring also maintains the ratchet arm in contact with the actuating pin 35. The spring also maintains a constant contact between the ratchet arm 33 and the ratchet wheel 37 as well as providing an actuating force for rotating the ratchet wheel. A slot 38 is also provided in the lower end of the ratchet arm to provide self-aligning of the ratchet arm 33 and the ratchet wheel 37. The adjustable strut comprises a screw member 39 threadedly engaging a sleeve member 40 which receives the cooperatively adjacent end of the primary brake shoe webbing 8 in a slot in its outer end. The opposite end of screw member 39 is a cylindrical structure which is received within the sleeve 41 which also has a slotted portion for receiving the secondary brake shoe webbing 10. FIG. 10 shows the ratchet arm 33 in contact with the ratchet wheel 37. The ratchet arm is held in position by means of a spring 36.

FIG. 11 is another modified version of the adjusting device for the vehicle brake. The backing plate, brake shoes, and brake drum are of the general type previously described. The ratchet arm 45 is connected to a link 46. This link 46 has a cam slot 47 which operates on the anchor pin 48. The opposite end of this link 46 is connected by means of a pin 49 to the secondary brake shoe webbing 10.

The lower position of the ratchet arm is provided with an alignment slot 50 for receiving the ratchet wheel 51. A single spring 52 maintains the ratchet arm in an aligned position together with the aid of the alignment slot 50. The adjustable strut placed between the two cooperatively adjacent ends of the brake shoes is of the type described in FIG. 8.

FIG. 13 is a cross section view of the adjustable strut which shows the ratchet arm 45 held in position by means of spring 52. The lower end of the ratchet arm 45 is engaging star wheel 51.

FIG. 12 is a fragmentary view showing the operation of the cammed link 46. If the link 46 is moved circumferentially within the brake drum, the cam slot 47 engaging the anchor pin 48 lifts the ratchet arm 46 which is in constant engagement with the star wheel 51.

The automatic brake adjuster operates in the following manner: The brake adjuster operates on the reverse braking cycle; however, this device will also operate on the forward braking cycle if an excessive amount of clearance exists between the brake shoes and the brake drum. As the brakes are actuated, the wheel cylinder 11 expands the brake shoes 3 and 4 outwardly against the drum 2. In the reverse braking operation, the friction between the two brake shoes on the rotating drum will produce a torque on the brake shoes. The reverse braking cycle would give a clockwise rotation of the rotating brake drum 2. This direction of rotation would tend to rotate the shoes in a clockwise direction about the inner periphery of the brake drum 2. When the shoe 4 moves away from anchor pin 12, the upper end of the ratchet arm 16 is also rotated with the shoe 4. As this end of the ratchet arm 16 rotates, the cam portion 17, operating on the anchor pin 12, lifts the ratchet arm. The lower end of the ratchet arm 16 is held in constant contact with the ratchet wheel 19 by means of the springs 20 and 21. If the brakes are in need of adjustment, the shoe 4 will sufficiently actuate the ratchet arm so that the lower portion will move a distance equal to the pitch of one notch on the ratchet wheel.

As the brakes are released, the return springs 13 and 14 will retract the brake shoes 3 and 4 to a rest position on the anchor pin 12. This movement will also produce a camming operation of the cam slot 17 on anchor pin 12. The camming operation forces the ratchet arm 16 downward. The two springs 20 and 21 also produce radially outward force on the lower end of the ratchet arm 16. The combination of force of the return springs 13 and 14 combined with the camming action, and the radially outward force of springs 20 and 21 actuate a rotating movement on the ratchet wheel 19. As the ratchet wheel 19 is rotated, the extensible strut is elongated, and this action thereby provides a brake adjustment.

It will be noted that in the operation of this brake adjusting device that the springs 20 and 21 produce components of force which perform several functions. The tangential component retains the cooperative adjacent ends of the primary brake shoe webbing 8 and secondary brake shoe webbing 10 in constant contact with the two ends of the adjustable strut. These two springs also perform the operation of centering the ratchet arm on the ratchet wheel through their tangential component of force. An axial component of force is also present. This component acts in a line parallel with the wheel shaft of the braking mechanisms. This force maintains a constant contact between the ratchet arm 16 of the ratchet wheel 19. The radially outward component of force produced by the springs 20 and 21 maintains a constant contact between the cam slot 17 of the anchor pin 12. This radial component of force also provides a function in aiding of the rotation of the ratchet wheel 19 as the brakes are being adjusted.

The modified version as shown in FIGS. 6 and 7 illustrates a self-disengaging ratchet arm 16 from the ratchet wheel 31. The screw member 29 has a threaded portion only on the one side of the ratchet wheel. As the ratchet wheel 31 is rotated, by means of the ratchet arm 16, the ratchet wheel 31 moves away from its central position on the extensible strut as it is rotated. FIG. 6 shows the ratchet wheel in its central position where it is being operated by the ratchet arm 16. FIG. 7 shows the ratchet wheel which has been adjusted sufficiently to rotate the ratchet wheel 31 out of engagement with the ratchet arm 16. The position illustrated in FIG. 7 indicates that the brake shoes are sufficiently worn so that they require replacement of the brake linings.

FIG. 8, 9, and 10 illustrate the single ratchet arm 33, which is held in an operating position against the ratchet wheel 37. A single spring 36 maintains a constant contact between the primary brake shoe webbing 8 and the secondary brake shoe webbing 10 with the extensible strut. This spring also maintains a constant contact between ratchet arm 33 and the ratchet wheel 37 as well as providing an actuating force for adjusting the extensible strut. The spring 36 also provides a force for maintaining the constant contact between the upper end of the ratchet arm 33 and the anchor pin 34. If the brakes are actuated, a pin 35, which is positioned on the brake shoe webbing of shoe 4, carries the upper end of the ratchet arm along with the shoe. This tangential movement of the upper end of the ratchet arm 33 moves the ratchet arm 33 radially inward from the ratchet wheel 37 on its lower end. This movement is caused by the cam portion fitting around the outer periphery of the upper portion of anchor pin 34.

If the brakes are released, the return springs 13 and 14 retract the brake shoes to a rest position on anchor pin 34. The spring 36, operating on the ratchet arm 33, produces the return movement of the upper end of the ratchet arm, thereby permitting the lower end of the ratchet arm to move radially outward. If a sufficient clearance existed between the brake shoes prior to the return of the ratchet arm, the lower end of the ratchet arm engages another notch on the ratchet wheel and provides an adjustment on its return movement. It will be noted that the spring 36 with its components of forces produces several functions as previously described.

The modification as illustrated on FIGS. 11, 12 and 13 employs a connecting link 46 between the ratchet arm 45 and the brake shoe webbing 10. In operation, this ratchet arm 45 operates quite similar to that illustrated in FIG. 1. The difference, however, is in that the ratchet arm extends to the radially outer side of the ratchet wheel 51. As the brakes are actuated, the shoe 4 carries along the link 46, which in turn operates on its camming surface 47 on anchor pin 48. This camming surface lifts the ratchet arm 45 which engages a cog on the ratchet wheel 51. If sufficient clearance exists between the brake shoes and the rotating brake drum, the ratchet wheel will move the distance of the pitch of one notch on the ratchet wheel, and thereby provide a brake adjustment. The operation of this braking device is on the application part of cycle, whereas the operation of the brake adjuster as illustrated in FIG. 1 was on the braking release part of the cycle.

Although these brake adjusting devices operate on a reverse braking cycle, it is pointed out that they will also operate on a forward braking cycle when an excessive amount of clearance exists between the brake shoes and the brake drum. The operation of the adjusting device will be the same as that described in the preceding paragraphs.

The safety feature illustrated in FIG. 5 provides for a metal of low temperature melting point 28 as the connection between ratchet wheel 19 and screw member 24. It provides a safety feature to avoid over adjustment when the brakes are hot as the metal then is in a fluid state.

While the embodiment of the present invention as herein disclosed constitutes a preferred form, it is to be understood that other forms might be adopted.

What is claimed is as follows:

1. In a braking structure comprising in combination a backing plate having an anchor pin, a rotating brake drum concentric with and adjacent to said backing plate, two brake shoes for frictionally engaging said brake drum and having cooperatively adjacent ends, spring means for retracting said brake shoes from said brake drum, a hydraulic cylinder operatively disposed between two of said cooperatively adjacent ends of said brake shoes, an adjustable strut member positioned between said opposite two cooperatively adjacent ends of said brake shoes comprising an internally threaded first sleeve member for engaging said opposite cooperatively adjacent end of one brake shoe, a second sleeve member having a smooth cylindrical internal surface for engaging the other of said opposite cooperatively adjacent end of said brake shoe, a screw member threadedly engaging said first sleeve member and for reception within said second sleeve member and carrying a ratchet wheel, an automatic adjusting device including a ratchet arm cammed on said anchor pin and actuated by one of said brake shoes, two springs each connected to the opposite end of said ratchet member and to one of said brake shoes for centering said opposite end of said ratchet member between said opposite two cooperatively adjacent ends of said brake shoes and thereby providing an automatic disengaging ratchet when said ratchet screw member is in the extended position within said adjustable strut member.

2. An automatic adjusting means for use in a vehicle brake comprised in combination, a backing plate having an anchor pin, a rotating brake drum mounted concentric with and adjacent to said backing plate, two brake shoes for frictionally engaging the inner periphery of said brake drum and having cooperative adjacent ends, means for actuating said vehicle brake positioned between two said cooperative adjacent ends of said brake shoes, an adjustable strut positioned between the opposite two cooperative adjacent ends of said brake shoes, said adjustable strut including a ratchet wheel mounted on a screw member, a sleeve having a threaded internal portion for reception of the threaded portion of said screw member, a second sleeve having a smooth cylindrical opening for reception of a smooth shank end portion of said screw member, a ratchet arm cammed on said anchor pin and engaging one of said brake shoes, a portion of said ratchet arm extending to a point adjacent to said ratchet wheel, spring means connecting said opposite two cooperative adjacent ends of said brake shoes and said ratchet arm for maintaining said extended portion of said ratchet arm in a central position between said opposite two cooperative adjacent ends of said brake shoes to disengage from said ratchet wheel when said adjusting screw is sufficiently extended in response to rotation of said ratchet wheel in adjustment of said vehicle brakes.

3. An automatic brake adjusting means for use in a vehicle brake comprising in combination, a backing plate having an anchor pin, a brake drum rotatably mounted adjacent to said backing plate, two brake shoes for frictionally engaging the inner periphery of said brake drum and having cooperative adjacent ends, means for actuating said vehicle brake positioned between two of said cooperative adjacent ends of said brake shoes, an adjustable strut positioned between the opposite two cooperative adjacent ends of said brake shoes, said adjustable strut including a sleeve engaging one of said opposite ends of said brake shoe and having a threaded inner portion, an adjusting screw having a ratchet wheel for threadedly engaging said threaded sleeve, a second sleeve member engaging the second of said two cooperative adjacent ends of said brake shoes, a smooth shank portion of said adjusting screw for reception within a smooth cylindrical opening in said second sleeve, a ratchet cammed on said anchor pin and engaging one of said brake shoes, said ratchet arm extending to a point adjacent to said ratchet wheel, spring means connected to said ratchet arm and said brake shoes for centrally locating the extended end portion of said ratchet arm between said opposite two cooperative adjacent ends of said brake shoes, said ratchet wheel moving to an off-center position and disengagement of said extended portion of said ratchet arm upon rotating of said ratchet wheel when said vehicle brakes are operated to thereby provide a means for preventing continued extension of said adjustable strut when said adjustable strut is extended to its maximum position.

4. An automatic brake adjusting means for use in a vehicle drum brake comprising in combination, a backing plate having an anchor pin, a brake drum rotatably mounted adjacent to said backing plate, two brake shoes for frictionally engaging the inner periphery of said brake drum having cooperative adjacent ends, means for actuating said vehicle brake positioned between two of said cooperative adjacent ends of said brake shoes, an adjustable strut positioned between the opposite two cooperative adjacent ends of said brake shoes, said adjustable strut including a sleeve engaging the first of said brake shoes and having a threaded inner portion for reception of an adjusting screw, said adjusting screw having a ratchet wheel and a smooth cylindrical shank portion on its opposite end, a second sleeve engaging the second of said brake shoes, said second sleeve receiving said smooth cylindrical shank of said adjusting screw, a brake adjusting device including a ratchet arm cammed on said anchor pin and engaging the second of said brake shoes, an extended portion of said ratchet arm extending to a point adjacent to said ratchet wheel, resilient means interconnecting said ratchet arm and said brake shoes for maintaining a central position of said extended portion of said ratchet arm centrally between said opposite two cooperative adjacent ends of said brake shoes, said extended portion of said ratchet arm adjusting said adjustable strut when said vehicle brakes are actuated by rotating said ratchet wheel of said screw member to a decentralized position relative to the opposite two adjacent ends of said brake shoes and thereby disengaging said extended portion of said ratchet arm when said adjustable strut is extended beyond a certain predetermined length.

5. An automatic brake adjusting means for use in a vehicle drum brake comprising in combination, a backing plate having an anchor pin, a brake drum rotatably mounted adjacent to said backing plate, two brake shoes for frictionally engaging said brake drum and having cooperative adjacent ends, means for actuating the vehicle brake positioned between two of said cooperative adjacent ends of said brake shoes, an adjustable strut positioned between the opposite two cooperative adjacent ends of said brake shoes, said adjustable strut including a sleeve engaging the first of said brake shoes and having a threaded internal portion, a second sleeve member engaging the second of said brake shoes and having a smooth cylindrical opening, a screw member having a ratchet wheel and a threaded portion threadedly engaging said threaded sleeve, said screw member having a smooth shank portion for reception within the cylindrical opening of said non-threaded sleeve, a brake adjusting means including a ratchet arm cammed on said anchor pin and engaging the second of said brake shoes, an extended portion of said ratchet arm extending to a point adjacent to said ratchet wheel, a spring means connected to the extending portion of said ratchet arm and to said opposite two cooperative adjacent ends of said brake shoes to maintain a central position of said extended position of said ratchet arm between the opposite two cooperative adjacent ends of said brake shoes, said screw member extending said adjustable strut in response to actuation of said vehicle brakes, said screw member being rotated by said ratchet arm to a decentralized position for disengaging said extended portion of said ratchet arm in response to elongation of said adjustable strut beyond a predetermined extended length.

References Cited in the file of this patent

UNITED STATES PATENTS

| | | |
|---|---|---|
| 1,824,552 | Khezarian | Sept. 22, 1931 |
| 2,132,576 | Nachtwey | Oct. 11, 1938 |
| 2,167,706 | Berno | Aug. 1, 1939 |
| 2,230,837 | Harvey et al. | Feb. 4, 1941 |
| 2,243,469 | Moore | Mar. 27, 1941 |
| 2,264,454 | Para | Dec. 2, 1941 |
| 2,804,177 | Helvern | Aug. 27, 1957 |
| 2,873,006 | Phillips | Feb. 10, 1959 |
| 2,938,610 | Dombeck et al. | May 31, 1960 |